Oct. 28, 1952     G. E. A. FALK     2,615,732
MAP CAPABLE OF BEING FOLDED TOGETHER AND SPREAD FLAT AGAIN
Filed March 14, 1950     2 SHEETS—SHEET 1
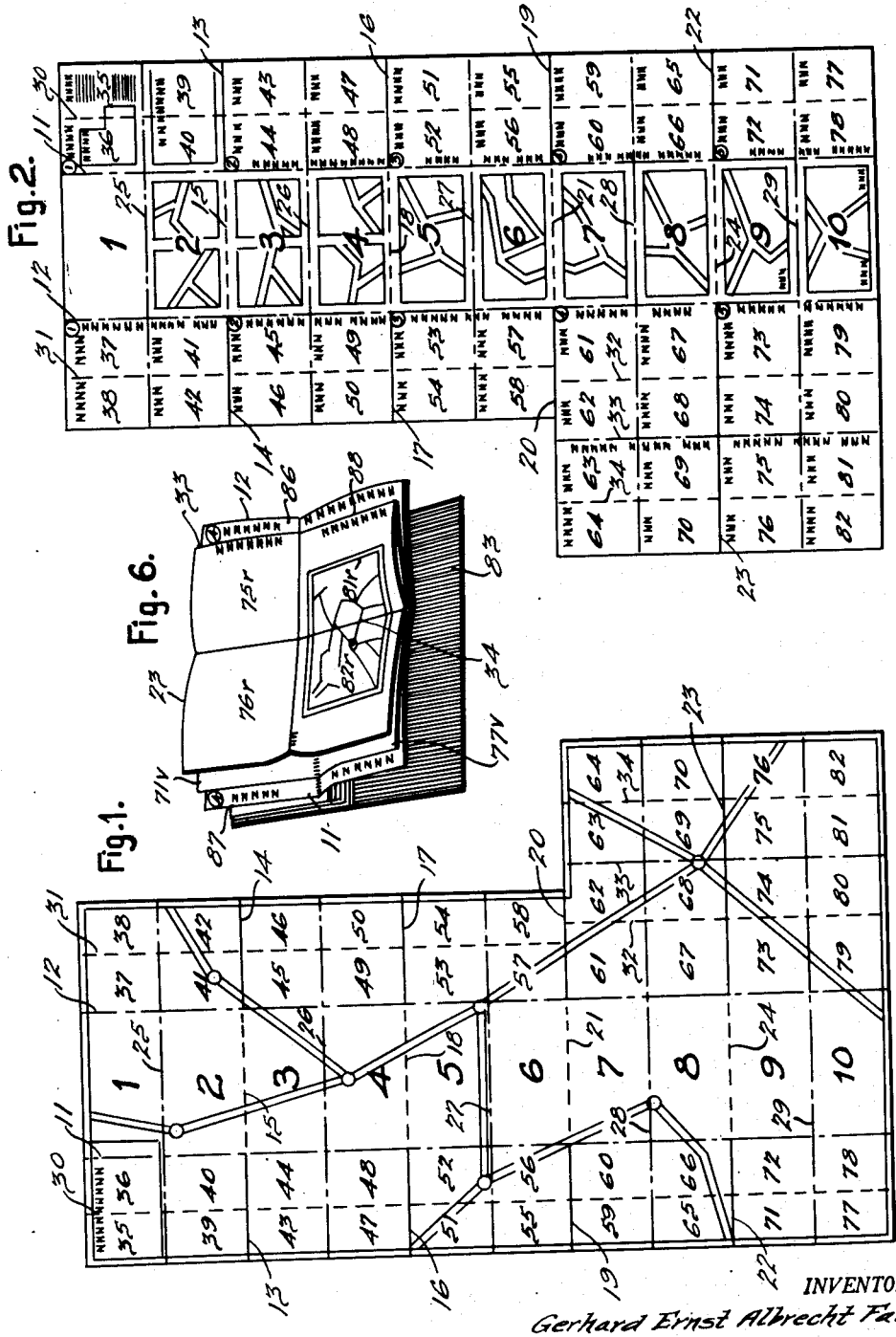
INVENTOR.
Gerhard Ernst Albrecht Falk.
BY
Harness, Dickey & Pierce
ATTORNEYS.

Oct. 28, 1952  G. E. A. FALK  2,615,732
MAP CAPABLE OF BEING FOLDED TOGETHER AND SPREAD FLAT AGAIN
Filed March 14, 1950  2 SHEETS—SHEET 2

INVENTOR.
Gerhard Ernst Albrecht Falk.
BY
Harness, Dickey & Pierce,
ATTORNEYS.

Patented Oct. 28, 1952

2,615,732

UNITED STATES PATENT OFFICE 2,615,732

MAP CAPABLE OF BEING FOLDED TOGETHER AND SPREAD FLAT AGAIN

Gerhard Ernst Albrecht Falk,
Hamburg, Germany

Application March 14, 1950, Serial No. 149,631
In Germany March 14, 1949

2 Claims. (Cl. 283—34)

The invention relates to a map capable of being folded together like a book and spread flat again.

If a map is in one direction a great deal narrower than in the other, it is easy to give it the form of a book. All one has to do is to fold it in accordion or zigzag form in the direction where it is longer. The height of the book, that is its length from top to bottom edge, is thus equal to the breadth of the map. The width of the book depends on the width chosen for the folds, and its thickness merely on the length of the map.

If however the size of the map in its two directions is of similar proportions, a book-like form can hardly be obtained by such folding. Only a more or less narrow strip is obtained in this way which however is still so long that it requires further folding to make a book of it.

Already many proposals have been put forward to solve the problem of folding a map in book-like form so that it can be read like a book and spread open like the conventional flat map. The inventor has, to solve this problem, adopted a new method which resulted in a map that meets it far better than earlier proposals in this direction.

In describing the invention it will be best to go out from its conception and history, although the features by which the invention may be characterized in form of claims must be defined in a different way.

The inventor makes first out of a map, which is in one direction not much wider than in the other, a long and narrow middle strip by providing the map with two cross-flaps each folded together in accordion or zigzag form. One of these cross-flaps is disposed along one of the long edges of the middle strip, the other cross-flap being aligned opposite it on the other edge. The first side of each cross-flap is folded or turned over toward the face of the middle strip, the width of the middle strip being chosen according to the height desired for the book. The narrow strip thus formed is folded in accordion or zigzag form with a plurality of longitudinal fold-breaks, which results in a book with one set of longitudinal fold-breaks lying on the book spine and the alternate longitudinal fold-breaks on the opposite or front edge of the book. Now the portions of the longitudinal fold-breaks which run across the cross-flaps, but only those fold-breaks directed to the front edge, are slit open down to the upper and lower edges of the book, that is, to the fold-breaks joining the middle strip to the two cross-flaps.

The map thus resulting possesses considerable advantages. When the book-formed map is opened the entire map compass can be viewed by merely unfolding the cross flaps on the upper and lower edge of the book. It is not necessary to spread the whole cross flap open. If for instance a zigzag cross flap consists of three sides folded in zigzag form to allow viewing the middle part of the map, only the three sides of the zigzag cross folding in their entirety need to be opened. The second and third side of the zigzag cross folding needs to be opened only if also the outer portion of the map is to be viewed. It will in this case do to, for example, open only the third side of the zigzag cross folding, whereby only the marginal portion of the map lies open for view.

A map thus put together in book-like form according to the invention is characterized by the feature that a book is constituted by folding a middle strip in accordion fashion to form a series of longitudinal panels, the upper and lower edges of which are provided with accordion cross-flaps running perpendicular to these longitudinal panels. The first side of each of these cross-flaps, when folded, faces the map area of the middle strip. These cross-flaps are separated into separate sections by providing slits in the cross-flaps along those alternate longitudinal fold-breaks which lie on the front edge of the book, these slits extending to the upper or lower book edge. The longitudinal fold-breaks lying on the book spine, on the other hand, run through on the cross-flaps, when folded together, in the same folding direction.

If the map has previously been provided with the slits described, also the cross-flaps can now be unfolded only after a pair of longitudinal panels are unfolded. In this way a map results which allows a view of the entire surface without it being necessary to unfold the map. Thus the map consists practically of but zigzag folding (to wit the longitudinal panels) together with another zigzag folding, that is the cross-flaps, which is vertically disposed to the former. By using the longitudinal folds, a map as big even as 2 to 3 m. high may easily be accommodated in a handy book-like container. The cross-folds permit of a similarly large extension of the map in the other direction.

The invention may be availed of to special advantage for auto maps. In this case it may sometimes prove practical to arrange the north-south direction of the map in the direction of its longitudinal folds which requires the book to be laid crosswise for reading the map.

It is under certain circumstances possible to make the number of sides of a zigzag cross-folding between the different slits of different sizes on order to better adapt the map to the extension of the whole area shown. It may for the same purpose also be advisable to dispose the cross-folds—this applies possibly also to a limited number of longitudinal folds—only on one side, that is only on the top or bottom edge of the book even if it may as a rule prove practical to provide cross-folds both on the top edge as well as the bottom edge of the length folds.

The cross-flaps provided on the upper and lower edge of the longitudinal panels, which are determinant for the size of the book, are suitably so dimensioned that they do not cover or touch each other so that a gap remains between two cross-flaps, along which they can easily be raised and turned over.

It may also be sometimes advisable to have a map picture also on the back of the cross-flaps, such picture then connecting with its fore-side. The view of these connected parts is then possible by simply turning over the cross-flaps.

Besides it will prove practical according to the invention to make the second side of a cross-flap a bit smaller in the direction of the upper or lower book edge than the first side. In this way on the back of the first side a strip results which may be used for instance for index purpose. A breadth of about 1 cm. for this strip proved practical.

If the back of the cross-flaps are not used for map illustration they can be used for supplementary cartographic representations in connection with the map on the front side. These backs may for instance be used to print connection maps on or simplified maps of towns or districts of the area shown on the front side, with their main streets, high-roads etc.

The longitudinal panels can also be turned over from the back whereby the whole surface of the sides of the middle strip is spread open. The back of the middle strip may accordingly be provided with additional information. These representations however, contrary to the representations on the backs of the cross-flaps, do not connect up with the main map.

The accompanying drawing shows an embodiment of the collapsible map in simplified representation.

Fig. 1 shows a view of the front side of a map according to the invention.

Fig. 2 shows a view of the back of the map corresponding with Fig. 1.

Figure 3:
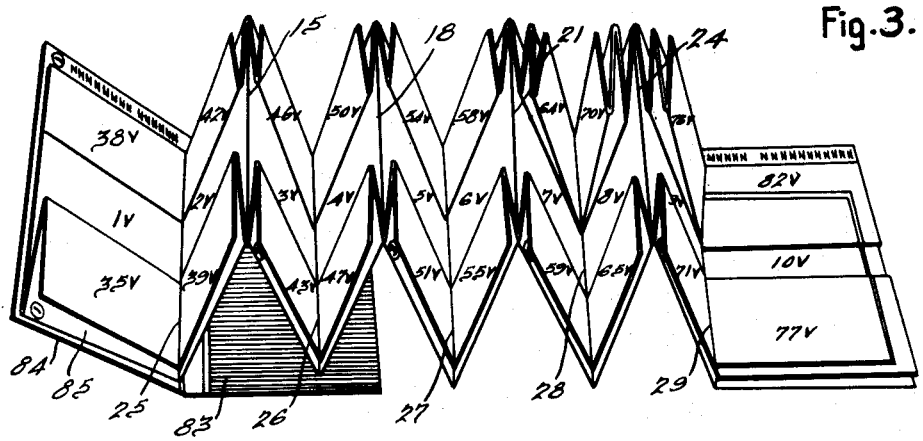

Fig. 3 is a pesrpective view of the map folded together like a book. It shows in particular the zigzag folding for the formation of the book. This perspective view allows a view of the front side of the map.

Figure 4:
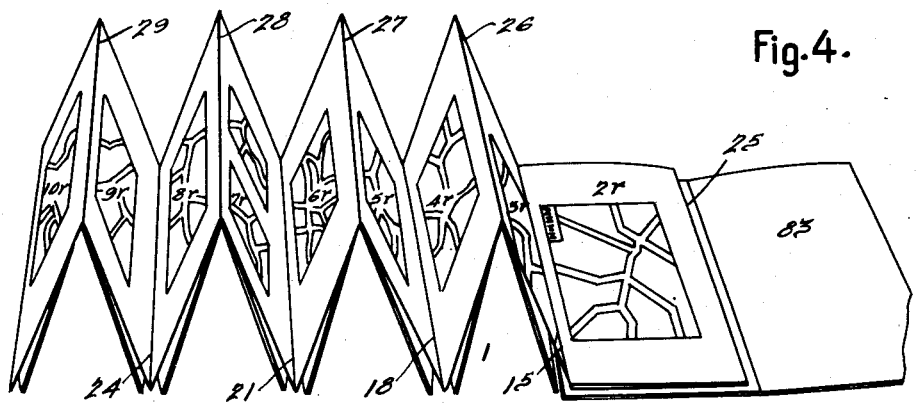

Fig. 4 is a perspective view similar to Fig. 3, however of the back of the map.

Figure 5:
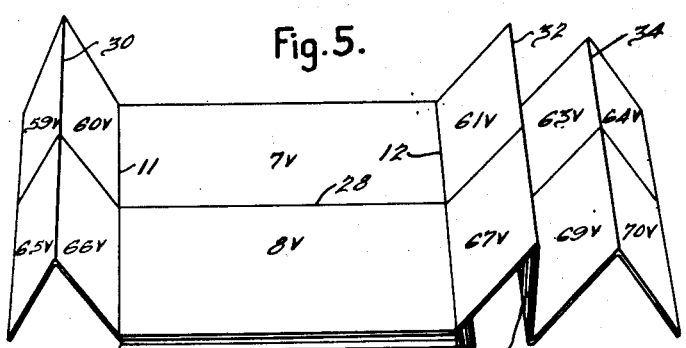

Fig. 5 is a perspective view of the map folded together in book form, this book being placed crosswise with the two cross-flaps provided for the upper and lower edge partly open.

Fig. 6 is a perspective view of the map shown in Figs. 1-5, folded together like a book, showing this book open in cross-position and with one cross-flap so opened that it affords a view upon its back.

As example an area is chosen that is a good deal larger in north-south direction than in east-west direction so that the map folded together according to the invention is read in broadside-wise form.

The cut of the map is as shown in Figures 1 and 2, considerably larger in its southern part than in its northern. As described below such a form can be made into a book-like map by application of the principles of the invention.

Panels 1 to 10 serve as the main body of the map. They can be folded together accordion-like into longitudinal folds. In the specification following all areas of the map which are separated from each other by folds or slits are designated by numbers. If it is necessary for detailed description to point out that front or back of this square area is meant, the letter $v$ is put behind the respective letter to designate the front, the letter $r$ to designate the back.

The height of the book when folded together is that of the size of the longer sides of areas 1—10 and the width that of the size of the smaller sides of areas 1—10. The map extends to both sides of central areas or panels 1 to 10, these side areas or cross-flaps being connected to the main body of the map by fold-breaks 11 and 12.

That portion of the map that lies on both sides of areas 1—10 is provided with slits going through as far as fold-breaks 11, 12 in the following manner. Slits 13, 14 lie in continuations of fold-break 15 which separates the two areas 2 and 3. The two slits 16 and 17 lie in continuation of the fold-break 18 which separates area 4 and 5 from each other. Slits 19 and 20 lie in continuation of fold-break 21 which separates the two areas 6 and 7 and slits 22 and 23 lie in continuation of fold-break 24 which separates areas 8 and 9.

Areas 1-10 can now be folded together in zigzag-like form in such a way that fold-breaks 15, 18, 21 and 24, together with the slits lying in their continuation show to the book front. Fold-breaks 25, 26, 27, 28 and 29 lie correspondingly on the book-back and run all across the map.

If this embodiment thus created and already resembling a book is then unfolded again somewhere, those parts of the map that lie to the right or left of the fold-breaks 11 and 12 which run all the way through the map according to Fig. 1 can be provided with further fold-breaks 30, 31, 32, 33, 34. While fold-break 30 runs, the same as fold-breaks 11 and 12, right across the map, fold-break 31 runs only from the top to slit 20. The area below slit 20 and on the right (in Fig. 1) from fold-break 12 is subdivided by the three fold-breaks 32, 33 and 34 in a different way. The distance between the left edge of the map (Fig. 1) and fold-break 30 is slightly smaller (about 1 cm.) than the distance between the fold-breaks 30 and 11. Conformably the distance between the right part of the map and fold-break 31 is also smaller than the distance between fold-breaks 31 and 12.

For the purpose explained later the distance between fold-break 12 and fold-break 32 is larger than that between fold-break 32 and 33. The distance between fold-break 33 and 34 is again larger than the distance between fold-break 34 and the right-hand edge of the map (Fig. 1). In this way areas result on the map which are designated with the numbers 35 to 82.

The areas between the fold-breaks 30 and 11 are folded in the direction of the front of the map, whereas the areas between fold-break 30 and the left edge of the map are folded in zigzag form in opposite direction. The same applies to the areas between the fold-breaks 12 and 31 and between fold-break 31 and the right outer edge of the map.

The different map areas below slit 20 are also folded in zigzag form by first folding the areas between fold-breaks 12 and 32 in the direction of the map front.

In Figs. 3–6 the mode of folding of the map, which also permits of the different possibilities of using the map, is shown. In comparing the reference symbols of these figures with Fig. 1 and 3 the kinds of folding are already made clear.

According to Fig. 3 the sides 1—10 are laid halfway together in accordion or zigzag form in order to show the mode of folding. Vertical to this folding on the lower edge of the book another accordion folding according to fold-breaks 11 and 30 is shown. A similar folding lies on the upper edge of this book with however only a folding made along fold-breaks 12 and 31 as far as fold-break 21 which continues in slit 20 whereas after that the folding along fold-breaks 32, 33, 34 was done. Fig. 3 also shows that the cross foldings made on the upper and lower edges of the book, along which fold-breaks 11 and 12 run, will not, when folded together, cover each other.

In Fig. 4 the back of the map may be seen in half-folded stage. As can be seen particularly well from Fig. 3, the map is provided with a protective wrapper which may be used additionally also for the reception of a booklet containing information about the map. This protective wrapper has the reference symbols 83, 84. On the back of side 84 of the protective wrapper the back of area 1 is pasted. This side 1 cannot be seen in Fig. 4 as it is covered by area 2. The backs of the areas 2—10 are, as may be inferred from Figs. 4 and 2, provided with small city maps in the example embodiment, showing for instance the thoroughfares of the more important cities which are contained on the map front area.

As already explained above, for instance areas 35 and 39 are slightly smaller than areas 36 and 40. By that arrangement a margin 85 results on the lower edge of the book, that is on the left-hand side of the map, while it is viewed. This margin may be used for index purposes. Fig. 3 shows that for instance the map area between the upper edge and fold-break 15 (with its continuation in slits 13 and 14) is designated with 1. Conformably the map areas between fold-breaks 15 and 18 are designated with 2, those between fold-breaks 18 and 21 with 3, those between 21 and 24 with 4 and those between 24 and the lower border with 5. This 5 is for instance contained also in Fig. 6. All these numbers are shown in the index margin. The index margin serves besides to point to the more important places situated in the respective map area. These index margins are very clearly shown in Fig. 6 where they are designated with 86, 87 and 88.

While the backs of the areas 2—10 must be printed upside down, contrary to the front of the map, to allow their view broadside-wise, as shown in Fig. 5, the backs of the cross-flaps, that is the flaps on the left of fold-break 11 and the flaps on the right of fold-break 12 in Fig. 1 can be read in the same direction of view as the front of the map without it being necessary that the printing is upside down. This is more clearly shown in Fig. 6 which shows how the backs of areas 75, 76, 81 and 82 can be read. By further turning over also the backs of areas 73, 74, 79 and 80 can be read. In a given case the back of the cross-flaps can therefore be used as continuation of the map representation of the front side. The backs of the cross-flaps may also be used to advantage for instance for city maps showing the principal thoroughfares. In this case preferably such cities are chosen as appear on the front side of the respective map section in reduced scale.

The map is read in broadside position as shown in Fig. 5 by turning the cross-flaps, when required, outwards. It is in that case often not even necessary to unfold all cross-flaps. After for instance areas 1 and 2 of the map have been opened, the areas 37 and 41 can be read. In this case their backs may remain folded together with the backs of areas 38 and 42 and only the cross-flaps need be laid around fold-break 12 outwards. As specially Fig. 2 shows, all backs of those areas which lie in this figure on the left of fold-break 12 have some text, for instance for explanations in connection with the map, or advertising matter. On the left of fold-break 12 (in Fig. 2) and on the left of fold-break 33 narrow strips have printing which may serve as index strips after the map is folded together.

The backs of the cross-flaps which lie on the right of fold-break 11 and above slit 13 (in Fig. 2) are arranged for receiving a general plan of the whole map and information referring to the general plan. Again a narrow strip on the right of fold-break 11 (in Fig. 2) serves for the reception of index information. Also all other areas on the right of fold-break 11 and below slit 13 (in Fig. 2) contain advertising text or information.

Having now particularly described and ascertained the nature of my invention and in what manner the same is to be performed, I declare that what I claim is:

1. A map capable of assuming a book-like form, comprising a middle strip having a plurality of longitudinal panels folded in accordion fashion to form a book, a plurality of cross-flaps extending from the upper and lower edges of said middle strip, each of said cross-flaps being folded in accordion fashion, the cross-flaps along said upper and lower edges each being separated into sections by a plurality of slits along those alternate fold-breaks between said longitudinal panels which are in the front of the book, said slits extending to the upper and lower edges of the book, the longitudinal fold-breaks lying on the book spine running through said cross-flaps in the same folding direction when the cross-flaps are folded together, the cross-flaps being so dimensioned and folded that there remains a gap between each pair of opposite cross-flaps when folded together, whereby both cross-flaps of a pair are simultaneously accessible for unfolding when a pair of adjacent panels are unfolded.

2. A map capable of assuming a book-like form, comprising a middle strip having a plurality of longitudinal panels folded in accordion fashion to form a book, a plurality of cross-flaps extending from the upper and lower edges of said middle strip, each of said cross-flaps being folded in accordion fashion, the cross-flaps along said upper and lower edges each being separated into sections by a plurality of slits along those alternate fold-breaks between said longitudinal panels which are in the front of the book, said slits extending to the upper and lower edges of the book, the longitudinal fold-breaks lying on the book spine running through said cross-flaps in the same folding direction when the cross-flaps are folded together, at least one of said cross-flaps being folded into areas of progressively decreasing width in a direction away from said middle strip, whereby an index strip will be exposed along the outer edge of the back of one of said areas when said cross-flap is folded.

GERHARD ERNST ALBRECHT FALK.

REFERENCES CITED

The following references are of record in the file of this patent:

FOREIGN PATENTS

| Number | Country | Date |
|---|---|---|
| 28,013 of 1907 | Great Britain | Dec. 17, 1908 |
| 613,092 | France | Nov. 8, 1926 |